United States Patent Office 3,309,327
Patented Mar. 14, 1967

3,309,327
METHOD OF STABILIZING COATING COMPOSITIONS AND PRODUCT THEREOF
Frederick H. Gayer, Chicago, Ill., assignor to Pyroxylin Products Inc., Chicago, Ill., a corporation of Illinois
No Drawing. Continuation of application Ser. No. 803,551, Apr. 2, 1959. This application Sept. 13, 1963, Ser. No. 308,659
14 Claims. (Cl. 260—21)

This invention relates generally to coating compositions and to extending the usefulness of coating compositions composed of solutions of thermosetting materials to which catalyst has been added to accelerate the setting of the film by shortening the cure-time. Specifically, the invention contemplates subsequently neutralizing the effect of at least a sufficient amount of the added catalyst to prevent gelation of such a composition between working periods, or neutralizing all of it when stored for an indefinite time. This application is a continuation of my copending application Ser. No. 803,551, filed Apr. 2, 1959, now abandoned.

Such conventional thermosetting coating compositions as are represented by those containing urea-formaldehyde and melamine-formaldehyde resins, or amine resins, or alkyd resins, or oil-modified alkyd resins, all having hydroxyl groups are commonly used in various ways, including the coating of various materials such as paper, paper board, films, foil, wood and metals. Uncatalyzed, the films deposited from such thermosetting compositions do not cure sufficiently due to the short time of heating practicable on the coating machines used in this art and/or the low temperature of cure which may be necessitated by the character of the material being coated. Therefore, it is conventional to accelerate the cure of such thermosetting compositions by the addition of an acidic curing catalyst of which the most frequently used ones are monoalkyl phosphates, toluene sulfonic acids and alkane sulfonic acids, among others, such as hydrochloric acid and phosphoric acid. These catalysts are used in a proportion of from a fraction of one percent to as much as eight percent, calculated on the solids content of the composition, the proportion of the catalyst depending on the nature of the components, on the heating cycle which the substrate can tolerate, and on the desired properties of the cured film. For example, an easily-cured amino resin, such as urea-formaldehyde will require less catalyst to give a comparable degree of cure than one of slower curing rate. Similarly, to obtain from the same coating composition a cured film which has to be resistant to heat and pressure at say 120° C. will require a higher proportion of catalyst than if it is required to pass such a test at only 50° C.

Catalysts added to a thermosetting resin composition may cause thickening or gelation which is the first visible evidence of the curing reaction, even at room temperature, the time in which gelation occurs depending on the nature of the ingredients and the type and proportion of the catalyst used. For example, composition having a butylated urea-formaldehyde resin may be stable for months when one percent of monobutyl phosphate is used as catalyst, whereas the same composition will thicken rapidly and gel overnight, or in eight to ten hours if it is catalyzed with three percent toluene sulfonic acid.

Since a gelled composition cannot be used for coating and has to be discarded, gelation of an unused catalyzed quantity of such a composition which is left at the end of a work period represents a loss and adds to the cost of operation.

In order to prevent gelation of premature cure, the composition and the requisite amount of catalyst are furnished as separate components to be combined. The catalyst is added immediately before the operation in which it is used. As the supply of catalyzed composition diminishes, it is continually replenished, for example, in the fountain of a coating machine. The supply of coating fluid left at the end of the work period is desirably transferred to a closed container for use on the following day or at a later date. If the composition has been strongly catalyzed as, for example, with more than two percent toluene sulfonic acid, it is likely to gel on standing overnight and thereby to become a complete loss.

It has been found that such catalytic thickening and gelation of the catalyzed compositions can be prevented by neutralizing all or at least an effective portion of the acidic catalyst contained in the fluid composition. A suitable agent for such complete or partial neutralization is an amine or mixture of amines which readily reacts with the acid catalyst to form a salt or salts. Such de-catalyzed coating compositions do not undergo undesirable thickening and gelation at ordinary temperatures for a period depending on the extent of the neutralization. When the fluid composition is to be put to use again, catalyst is again added and the coating operation is continued. The amount of catalyst to be added to a de-catalyzed composition is preferably the chemical equivalent of the quantity of amine previously added to de-catalyze. The film resulting from such neutralized and recatalyzed compositions according to my invention is of the same quality as the film obtained from the original catalyzed composition.

Amines function because of the basic character of the amine group —$NH_2$ and its derivative groups —NHR and —NRR′, these being primary, secondary and tertiary amines, in which R and R′ are hydrocarbon radicals. The amines may contain more than one of such amine groups, thus including monoamines and polyamines.

The suitability of an amine for the present invention depends upon the strength of the amine (measured as its ionization constant) relative to the strength of the acid catalyst (measured by its ionization constant). The amine must be sufficiently strong fully to neutralize the acid catalyst as distinguished from entering into an equilibrium reaction with it in which part of the acid catalyst is not neutralized in the presence of an unreacted portion of an added weak amine. Accordingly, the suitable amines are herein designated as neutralizing amines.

In general, the basicity, or neutralizing strength of an amine, decreases as the molecule becomes larger by increasing the molecular weight of the radicals attached to the nitrogen atom. For example, in the homologous series $XNH_2$ wherein X is an alkyl radical, the basicity decreases as the number of carbon atoms increases. The critical number of carbon atoms dividing operable and inoperable amines $XNH_2$ is not absolute but varies with the strength of the acid catalyst.

Chemical functioning for the purposes of the present invention sometimes yields to practical considerations in choosing an amine. The higher the molecular weight, the less desirable is the amine, because it loads the coating composition with inert matter. Some polyamines which function involve human hazards, being skin irritants or sensitizing agents.

An important consideration in choosing a neutralizing amine for a given catalyst and a given catalyzed composition is the solubility of the salt formed on adding the amine to the catalyzed composition. If the salt is insoluble, the precipitate could cause haziness of the film subsequently produced from an originally clear coating composition. Since some amines may give a precipitation with one catalyst but not with the others, the solubility of the amine salt formed in the liquid coating composition should be tested before using the amine, where such haziness is to be avoided.

In general, the preferred neutralizing amines are alkyl amines, cyclohexyl amine and morpholine. In the homologous series of alkyl primary, secondary and tertiary amines those having the lower alkyl radicals are preferred. Among these, the three methyl amines are gases at normal room temperatures, and to use them as gases, special apparatus is required, or otherwise the gases are used in a suitable solution not harmful to the coating composition, such as in a compatible volatile solvent.

Accordingly, the term "neutralizing amine" as used herein, designates for a particular acid catalyst, one which is sufficiently basic fully to neutralize all the acid catalyst. The preferred neutralizing amine is selected from the group consisting of morpholine, cyclohexyl amine, primary, secondary and tertiary alkyl amines having from 1 to 6 carbon atoms in the alkyl radical, and mixtures of the foregoing amines.

The following examples illustrate the invention by reference to commonly employed coating compositions:

*Example 1*

(A) A varnish of the following composition was used:

| | Lbs. |
|---|---|
| Butylated urea-formaldehyde resin (50% non-volatile) (Resimene U–901 of Monsanto Chemical Co., St. Louis, Mo.) | 120 |
| Maleic alkyd-modified rosin ester (Lewisol 28 of Hercules Powder Co., Wilmington, Del.) | 96 |
| Castor-oil modified short-oil alkyd resin (50% non-volatile) (Aroplaz 2480 of Archer-Daniels-Midland Co., Minneapolis, Minn.) | 120 |
| Paraffin wax | 4 |
| Toluol | 100 |
| | 440 |

(B) The catalyst was made by dissolving monobutyl phosphate in toluol in a proportion of 3 gram moles of monobutyl phosphate per liter of solution.

(C) The neutralizing solution was made by dissolving cyclohexyl amine in toluol in a proportion of 3 gram moles of cyclohexyl amine per liter of solution.

The varnish was catalyzed by stirring 12 fluid ounces of catalyst (B) into each 5 gallons of varnish and the solids content reduced by thinning with 1 gallon of toluol for each 4 gallons varnish. At the end of the working day a quantity of 20 gallons of catalyzed varnish was left, corresponding to 16 gallons of unthinned varnish. A laboratory sample of the catalyzed varnish was removed for comparison with the neutralized main portion. At the end of the day the catalyst in the main portion was neutralized with 38 fluid ounces of neutralizing solution (C). After standing overnight the laboratory sample was gelled, but the neutralized main portion appeared to be unchanged. After adding 38 fluid ounces of catalyst (B) to the main portion the coating operation was continued. The coated film had the same appearance and passed the same tests as that obtained on the previous day.

*Example 2*

(A) A varnish of the following composition was used:

| | Lbs. |
|---|---|
| Butylated melamine-formaldehyde resin (50% non-volatile) (Melmac 247–10 of American Cyanamid Co., New York, N. Y. | 140 |
| Pentaerythritol ester of maleated rosin (Arochem 545 of Archer-Daniels-Midland Co., Minneapolis, Minn.) | 86 |
| Non-drying alkyd resin (60% non-volatile) (Rezyl 99–4 of American Cyanamid Co., New York, N.Y.) | 67 |
| Paraffin wax | 4 |
| Toluol | 103 |

(B) The catalyst was made by dissolving toluene sulfonic acid (a mixture of para and ortho isomers) in ethanol in a proportion of 3 gram moles of toluene sulfonic acid per liter of solution.

(C) The neutralizing agent was made by dissolving morpholine in toluol in a proportion of 3 gram moles of morpholine per liter of solution.

The varnish was catalyzed by stirring into each 5 gallons of varnish 18 fluid ounces of catalyst (B). Then the varnish was thinned with 1 gallon of toluol for each 5 gallons of varnish. The coating run was started and continued all day, during which time the fountain was fed with said catalyzed and thinned varnish. At the end of the working day a laboratory sample of the catalyzed varnish was taken to observe its gelling progress, and the main portion (14 gallons) was treated with neutralizing agent (C), the required quantity of which was calculated as follows:

Since thinning was in the ratio of 5 gallons varnish to 1 gallon toluol, 13 gallons of thinned and catalyzed varnish represents 11.7 gallons original unthinned varnish which require 41 fluid ounces of catalyst. To neutralize the catalyst 41 fluid ounces of neutralizing agent (C) were stirred in. The retained laboratory sample changed to a solid gel after seven days. The neutralized main portion was unchanged after one month of storage, and after re-catalyzing with 41 fluid ounces of catalyst (B) gave a coating which was identical with that obtained previously.

When the original acid catalyst is not entirely neutralized, thus preventing gelation in a predetermined short period of time, the decatalyzed composition comprises the residual acid catalyst and salt as the reaction product of acid catalyst and the added neutralizing amine therefor.

When all the acid catalyst is neutralized the resulting de-catalyzed composition comprises salt as the reaction product of all the acid catalyst and the added neutralizing amine therefor.

When the partially or wholly de-catalyzed compositions above referred to are re-catalyzed by adding the acid catalyst which is the same or different from that originally present, the composition comprises an effective catalyzing quantity of acid catalyst and salt, which salt is the reaction product of acid catalyst for the resin content and neutralizing amine for said last-mentioned acid catalyst added to the corresponding thermosetting composition catalyzed at least in part by said last-mentioned acid catalyst.

When the neutralizing amine is a monoamine and the acid catalyst is monobasic, one mole of the amine is required completely to neutralize one mole of acid catalyst. Where less than said one mole of the amine is used the period of non-gelling stability is more limited as the deficiency of amine increases. Where more than said one mole of amine is used, no increase in stability results, and the excess must be neutralized by a chemically equivalent amount of an acid to bring the composition to the neutral point as a starting point for adding re-catalyzing acid. In order to return a de-catalyzed composition to its original catalyzed state, one must add an amount of acid catalyst which is the chemical equivalent of the added neutralizing amine.

The invention is subject to such numerous variations and modifications other than those referred to above, as fall within the scope of the appended claims.

What is claimed is:

1. A de-catalyzed coating composition comprising thermosetting resin, a quantity of acid catalyst, said acid catalyst being ineffective to lead to gelation in a predetermined short period of time, and organic salt, said salt being the reaction product of an additional quantity of said acid catalyst and neutralizing amine for said catalyst added to the corresponding thermosetting resin composition catalyzed with said two quantities of said acid catalyst, said acid catalyst being selected from the group consisting of monoalkyl phosphates, toluene sulfonic acids, alkane sulfonic acids, hydrochloric acid and phosphoric acid, said corresponding thermosetting resin composition being normally unstable and slowly reactive to advance the catalyzed resinification.

2. A de-catalyzed coating composition according to claim 1 in which said amine is selected from the group consisting of cyclohexyl amine, morpholine, alkyl monoamines having in the alkyl group from 1 to 6 carbon atoms, and mixtures thereof.

3. A de-catalyzed varnish composition according to claim 1 in which said salt is dissolved.

4. A de-catalyzed varnish composition according to claim 1 in which said amine is selected from the group consisting of cyclohexyl amine, morpholine, alkyl monoamines having in the alkyl group from 1 to 6 carbon atoms, and mixtures thereof, and in which said salt is dissolved.

5. A catalyzed coating composition which is slowly reactive to advance the resinification, comprising thermosetting resin, a quantity of acid catalyst selected from the group consisting of monoalkyl phosphates, toluene sulfonic acids, alkane sulfonic acids, hydrochloric acid and phosphoric acid, and organic salt, said salt being the reaction product of an additional quantity of said acid catalyst for said resin and neutralizing amine for said last-mentioned quantity of acid catalyst, which amine has been added to the thermosetting resin composition catalyzed at least in part by said last-mentioned quantity of catalyst to de-catalyze the same.

6. In the coating art, the steps of adding an acid catalyst to a normally stable thermosetting resin to provide a normally unstable thermosetting coating composition adapted for substantially immediate use in a coating machine and the like, subsequently forming a stabilized coating composition-salt mixture adapted for storage by neutralizing at least a portion of said acid catalyst by adding to said composition neutralizing amine for said acid catalyst, subsequently forming a second normally unstable coating composition by adding an acid catalyst to said stabilized coating composition-salt mixture, which second composition is adapted for substantially immediate use in a coating machine and the like.

7. In the coating art, the steps of adding an acid catalyst to a thermosetting resin to provide a thermosetting coating composition adapted for substantially immediate use in a coating machine and the like, subsequently stabilizing said coating composition by neutralizing at least a portion of said acid catalyst by adding a quantity of neutralizing amine to the coating composition, said neutralizing amine being of sufficient strength to react completely with the acid catalyst to form a salt and leave no residue of neutralizing amine, subsequently forming a second thermosetting coating composition adapted for substantially immediate use in a coating machine or the like by adding acid catalyst to the aforementioned stabilized coating composition in an amount which is substantially the chemical equivalent of the added neutralizing amine.

8. The method according to claim 6 wherein the acid catalyst is selected from the group consisting of monoalkyl phosphates, toluene sulfonic acids, alkane sulfonic acids, hydrochloric acid and phosphoric acid.

9. The method according to claim 7 wherein the acid catalyst is selected from the group consisting of monoalkyl phosphates, toluene sulfonic acids, alkane sulfonic acids, hydrochloric acid and phosphoric acid.

10. In the coating art involving the application of a thermosetting coating composition, subsequent storage of the coating composition, and subsequent reuse of the coating composition; the steps of adding an acid catalyst to the thermosetting coating composition in an amount sufficient to materially accelerate the curing thereof so as to render the composition suitable for the aforesaid application thereof, preparing the catalyzed coating composition for the aforesaid storage by adding a neutralizing amine thereto in an amount sufficient to retard catalyzed resinification of the coating composition to a level in which the usefulness of the composition is not destroyed within the time period of storage, and recatalyzing the storage product by adding acid catalyst thereto to form the aforesaid reusable coating composition.

11. The method according to claim 10 wherein the acid catalyst is selected from the group consisting of monoalkyl phosphates, toluene sulfonic acids, alkane sulfonic acids, hydrochloric acid and phosphoric acid.

12. A coating composition adapted for substantially immediate use in a coating machine and the like, comprising thermosetting resin, a quantity of acid catalyst, and organic salt, said organic salt being the reaction product of a previously added quantity of said acid catalyst and neutralizing amine for said previously added acid catalyst.

13. The method of stabilizing a catalyzed thermosetting coating composition for storage purposes and subsequently recatalyzing the stabilized composition, which comprises stabilizing a thermosetting coating composition containing thermosetting resin and acid catalyst therefor by adding neutralizing amine to such composition in an amount to neutralize at least a portion of said acid catalyst sufficient to permit reuse of the composition after storage, and then preparing the compopsition containing the organic salt of the acid catalyst and the neutralizing amine for reuse by adding a quantity of acid catalyst to such composition.

14. The method according to claim 13 wherein the acid catalyst is selected from the group consisting of monoalkyl phosphates, toluene sulfonic acids, alkane sulfonic acids, hydrochloric acid and phosphoric acid.

References Cited by the Examiner

UNITED STATES PATENTS

| | | | |
|---|---|---|---|
| 2,904,525 | 9/1959 | Babcock et al. | 260—21 |
| 2,915,486 | 12/1959 | Shelley | 260—21 |
| 3,196,117 | 7/1965 | Boller | 260—22 |

LEON J. BERCOVITZ, *Primary Examiner.*

R. W. GRIFFIN, *Assistant Examiner.*